(12) United States Patent
Jung et al.

(10) Patent No.: US 12,068,112 B2
(45) Date of Patent: *Aug. 20, 2024

(54) CERAMIC ELECTRONIC COMPONENT

(71) Applicants: SAMSUNG ELECTRO-MECHANICS CO., LTD., Suwon-si (KR); RESEARCH & BUSINESS FOUNDATION SUNGKYUNKWAN UNIVERSITY, Suwon-si (KR)

(72) Inventors: Dong Jun Jung, Suwon-si (KR); Hye Jin Jeong, Suwon-si (KR); Zhipeng Wang, Suwon-si (KR); Jin Wan Park, Suwon-si (KR); Min Hoe Kim, Suwon-si (KR); Sang Ho Oh, Suwon-si (KR); Jong Ho Lee, Suwon-si (KR)

(73) Assignees: SAMSUNG ELECTRO-MECHANICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 74 days.

This patent is subject to a terminal disclaimer.

(21) Appl. No.: 17/945,167

(22) Filed: Sep. 15, 2022

(65) Prior Publication Data

US 2023/0088775 A1 Mar. 23, 2023

Related U.S. Application Data

(63) Continuation-in-part of application No. 17/714,673, filed on Apr. 6, 2022.

(30) Foreign Application Priority Data

Sep. 17, 2021 (KR) .......................... 10-2021-0125154
May 11, 2022 (KR) .......................... 10-2022-0058045
(Continued)

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *C04B 35/64* (2013.01);
(Continued)

(58) Field of Classification Search
CPC .............. C04B 35/4682; C04B 35/64; C04B 2235/3224; H01G 4/008; H01G 4/012; H01G 4/1227; H01G 4/30
See application file for complete search history.

(56) References Cited

U.S. PATENT DOCUMENTS

2010/0142120 A1* 6/2010 Azuma ................... H01B 3/12
361/321.5
2019/0057813 A1 2/2019 Okamoto
(Continued)

FOREIGN PATENT DOCUMENTS

JP 2013-151380 A 8/2013
JP 2019-161217 A 9/2019
(Continued)

OTHER PUBLICATIONS

N.-H. Chan et al., "Defect Chemistry of Donor-Doped BaTiO3", Journal of the American Ceramic Society, vol. 67, No. 4, 1984, pp. 285-288.

*Primary Examiner* — Nathan Milakovich
(74) *Attorney, Agent, or Firm* — MORGAN, LEWIS & BOCKIUS LLP

(57) ABSTRACT

A ceramic electronic component includes a body including a dielectric layer and an internal electrode; and an external electrode disposed on the body and connected to the internal electrode. The dielectric layer has a perovskite structure represented by a general formula $ABO_3$ as a main phase, and includes a region in which Dy is solid solubilized. In the region in which the Dy is solid solubilized, an X-ray count of Dy solid-solubilized in an A-site of the perovskite structure measured by using Scanning Transmission Electron Microscopy-Energy Dispersive X-ray Spectroscopy (STEM-EDS) is AD, an X-ray count of Dy solid-solubilized in a B-site of the perovskite structure is BD, and an average value of AD/BD is 1.6 or more and 2.0 or less.

32 Claims, 12 Drawing Sheets
(3 of 12 Drawing Sheet(s) Filed in Color)

(30) Foreign Application Priority Data

Jul. 7, 2022 (KR) .................. 10-2022-0084012
Aug. 31, 2022 (KR) .................. 10-2022-0109929

(51) Int. Cl.
| | | |
|---|---|---|
| C04B 35/64 | (2006.01) | |
| H01G 4/008 | (2006.01) | |
| H01G 4/012 | (2006.01) | |
| H01G 4/30 | (2006.01) | |

(52) U.S. Cl.
CPC ............ *H01G 4/008* (2013.01); *H01G 4/012* (2013.01); *H01G 4/30* (2013.01); *C04B 2235/3224* (2013.01)

(56) References Cited

U.S. PATENT DOCUMENTS

| | | | |
|---|---|---|---|
| 2019/0279816 A1* | 9/2019 | Taniguchi | C04B 35/4682 |
| 2020/0402719 A1* | 12/2020 | Sugawara | C04B 35/4682 |
| 2021/0210288 A1* | 7/2021 | Kang | C04B 35/4682 |
| 2022/0223346 A1* | 7/2022 | Morita | C04B 35/4682 |
| 2022/0301770 A1* | 9/2022 | Lee | H01G 4/30 |
| 2022/0301773 A1* | 9/2022 | Hamada | H01G 4/1227 |
| 2023/0093711 A1* | 3/2023 | Jung | C04B 35/64 |
| | | | 361/137 |
| 2023/0126670 A1* | 4/2023 | Kim | H01G 4/248 |
| | | | 361/301.4 |

FOREIGN PATENT DOCUMENTS

| | | |
|---|---|---|
| JP | 2021-002646 A | 1/2021 |
| KR | 10-2018-0122418 A | 11/2018 |
| WO | 2006/025205 A1 | 3/2006 |

* cited by examiner

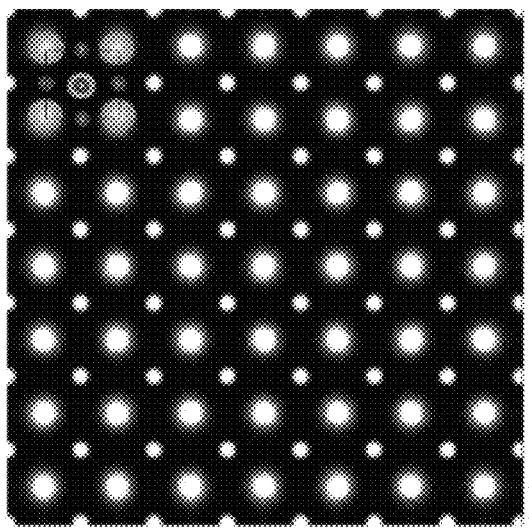
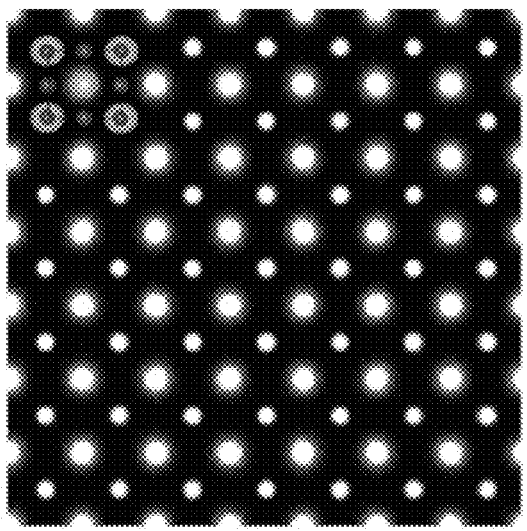
FIG. 15A  FIG. 15B
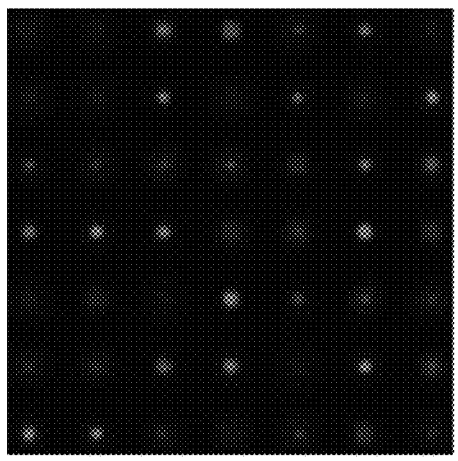
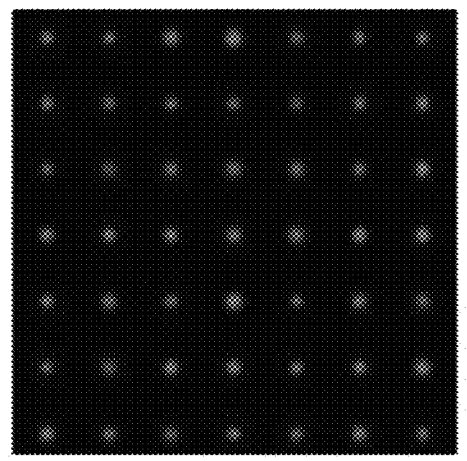
FIG. 16A  FIG. 16B

CERAMIC ELECTRONIC COMPONENT

CROSS-REFERENCE TO RELATED APPLICATION(S)

This application is a continuation-in-part application of U.S. application Ser. No. 17/714,673 filed on Apr. 6, 2022 which claims benefit under 35 USC 119(a) of Korean Patent Application No. 10-2021-0125154 filed on Sep. 17, 2021. This application claims benefit under 35 USC 119(a) of Korean Patent Application No. 10-2022-0058045 filed on May 11, 2022, Korean Patent Application No. 10-2022-0109929 filed on Aug. 31, 2022, and Korean Patent Application No. 10-2022-0084012 filed on Jul. 7, 2022 in the Korean Intellectual Property Office. All of the disclosures are incorporated herein by reference for all purposes.

TECHNICAL FIELD

The present disclosure relates to a ceramic electronic component.

BACKGROUND

Multilayer ceramic capacitors (MLCCs), ceramic electronic components, are chip-type capacitors mounted on the printed circuit board of various electronic products, such as imaging devices such as a liquid crystal display (LCD) and a plasma display panel (PDP), a computer, a smartphone, and a mobile phone, to charge or discharge electricity.

Such multilayer ceramic capacitors may be used as components of various electronic devices due to the small size, high capacitance, and easiness in mounting thereof. Recently, as various electronic devices such as computers and mobile devices have been miniaturized and had high output, demand for miniaturization and high capacitance of multilayer ceramic capacitors has also increased.

To obtain miniaturization and high capacitance of a multilayer ceramic capacitor, the number of stacked layers should be increased by reducing the thickness of the dielectric layer and the internal electrode. At present, the thickness of the dielectric layer has reached the level of about 0.6 μm, and thinning continues. However, as the thickness of the dielectric layer decreases, the electric field applied to the dielectric at the same operating voltage increases. Therefore, it is essential to secure the reliability of the dielectric layer.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a ceramic electronic component having excellent reliability.

An aspect of the present disclosure is to provide a ceramic electronic component including an N-type semiconductorized dielectric layer.

An aspect of the present disclosure is to provide a ceramic electronic component having excellent high-temperature reliability.

According to an aspect of the present disclosure, a ceramic electronic component includes a body including a dielectric layer and an internal electrode; and an external electrode disposed on the body and connected to the internal electrode. The dielectric layer has a perovskite structure represented by a formula $ABO_3$ as a main phase, and includes a region in which Dy is solid solubilized. In the region in which the Dy is solid solubilized, an X-ray count of Dy solid-solubilized in an A-site of the perovskite structure measured by using Scanning Transmission Electron Microscopy-Energy Dispersive X-ray Spectroscopy (STEM-EDS) is AD, an X-ray count of Dy solid-solubilized in a B-site of the perovskite structure is BD, and an average value of AD/BD is 1.6 or more and 2.0 or less.

According to an aspect of the present disclosure, a ceramic electronic component includes a body including a dielectric layer and an internal electrode; and an external electrode disposed on the body and connected to the internal electrode. The dielectric layer has a perovskite structure represented by a formula $ABO_3$ as a main phase, and includes a region in which Dy is solid solubilized. In the region in which the Dy is solid solubilized, an X-ray count of Dy solid-solubilized in an A-site of the perovskite structure measured by using STEM-EDS is AD, an X-ray count of Dy solid-solubilized in a B-site of the perovskite structure is BD, and an average value of AD/BD satisfies 1.6 or higher. The dielectric layer includes a plurality of grains and a grain boundary disposed between adjacent grains, and at least one of the plurality of grains has a structure including a region in which Dy is solid solubilized throughout the grains.

According to an aspect of the present disclosure, a ceramic electronic component includes a body including a dielectric layer and an internal electrode; and an external electrode disposed on the body and connected to the internal electrode. The dielectric layer has a perovskite structure represented by a formula $ABO_3$ as a main phase, and includes a region in which Dy is solid solubilized. In the region in which the Dy is solid solubilized, a number of atoms of Dy solid-solubilized in an A-site of the perovskite structure is AR, a number of atoms of Dy solid-solubilized in a B-site of the perovskite structure is BR, and AR/BR is 2.1 or more and 4.2 or less.

BRIEF DESCRIPTION OF DRAWINGS

The patent or application file contains as least one drawing executed in color. Copies of this patent or patent application publication with color drawing(s) will be provided by the Office upon request and payment of the necessary fee.

The above and other aspects, features, and advantages of the present inventive concept will be more clearly understood from the following detailed description, taken in conjunction with the accompanying drawings, in which:

FIG. 15A is an atomic column image generated as a result of simulation for the first supercell, and FIG. 15B is an atomic column image generated as a result of simulation for the second supercell; and FIG. 16A is a Dy L X-ray count for FIG. 15A, and FIG. 16B is a Dy L X-ray count for FIG. 15B.

DETAILED DESCRIPTION

Figure 1:
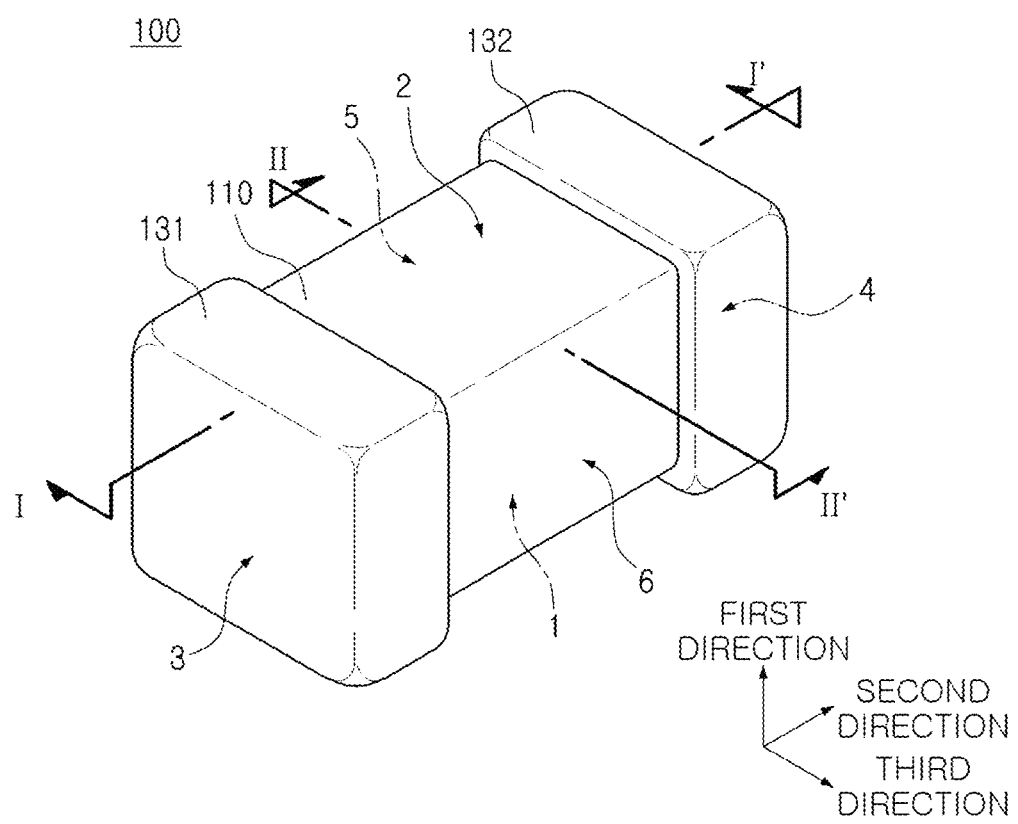
FIG. 1 schematically illustrates a perspective view of a ceramic electronic component according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least an embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the drawings, a first direction may be defined as a stacking direction or a thickness (T) direction, a second direction may be defined as a length (L) direction, and a third direction may be defined as a width (W) direction.

Ceramic Electronic Component

FIG. 1 schematically illustrates a perspective view of a ceramic electronic component according to an embodiment.

Figure 2:
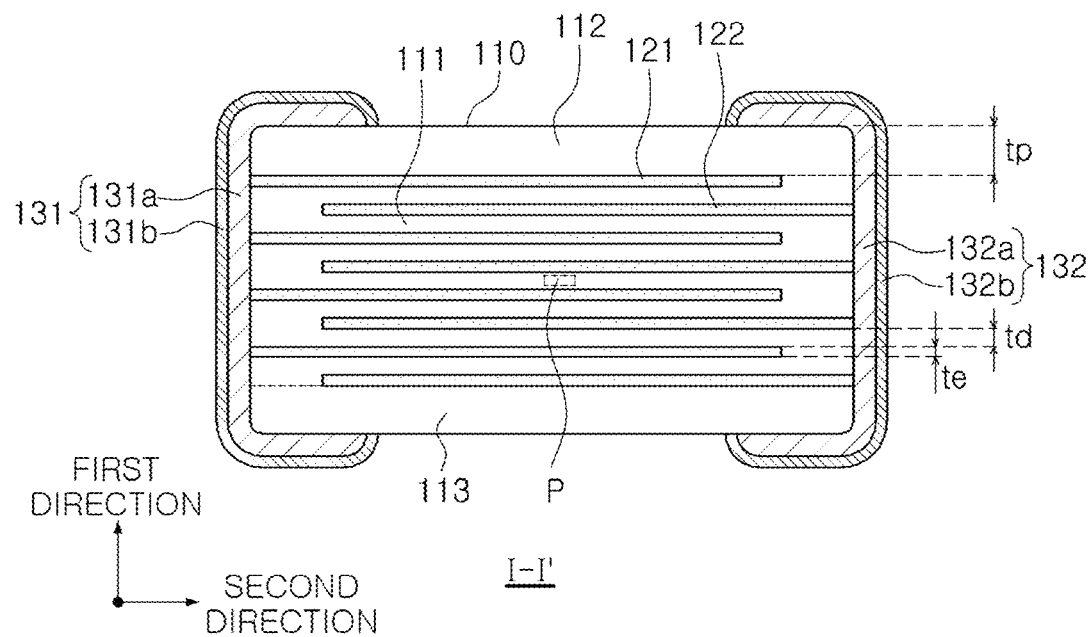
FIG. 2 schematically illustrates a cross-sectional view taken along line I-I' of FIG. 1.

FIG. 2 schematically illustrates a cross-sectional view taken along line I-I' of FIG. 1.

Figure 3:
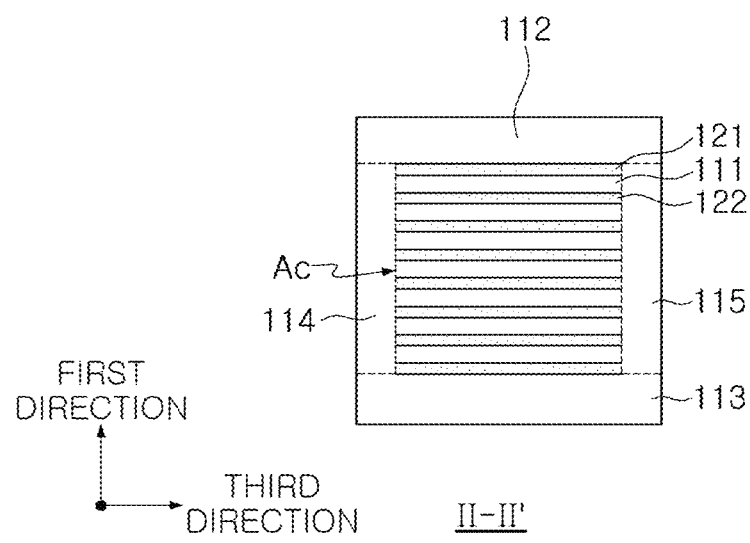
FIG. 3 schematically illustrates a cross-sectional view taken along line II-II' of FIG. 1.

FIG. 3 schematically illustrates a cross-sectional view taken along line II-II' of FIG. 1.

Figure 4:
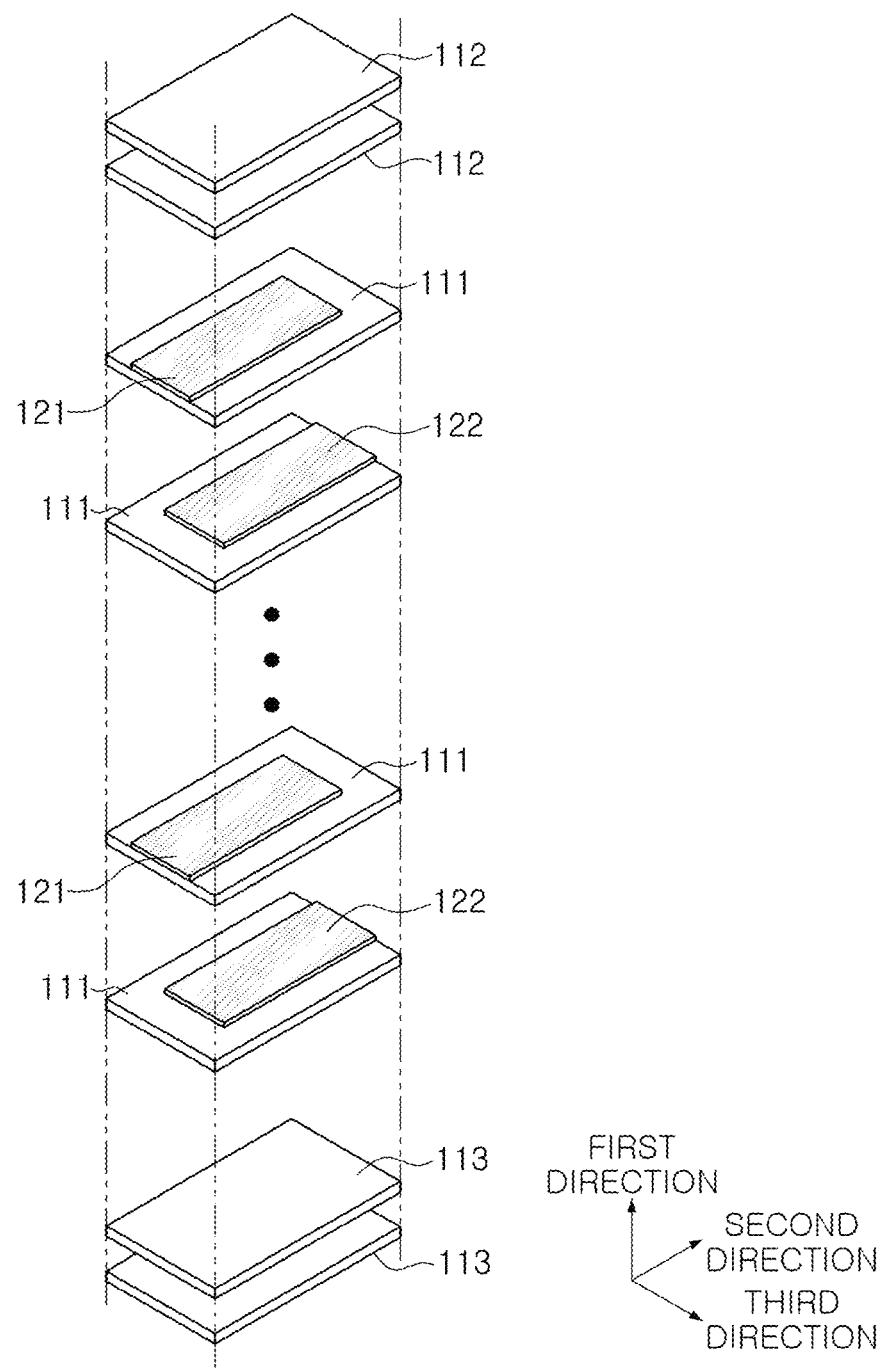
FIG. 4 is an exploded perspective view schematically illustrating an exploded body of a ceramic electronic component according to an embodiment.

FIG. 4 is an exploded perspective view schematically illustrating an exploded body of a ceramic electronic component according to an embodiment.

Figure 5:
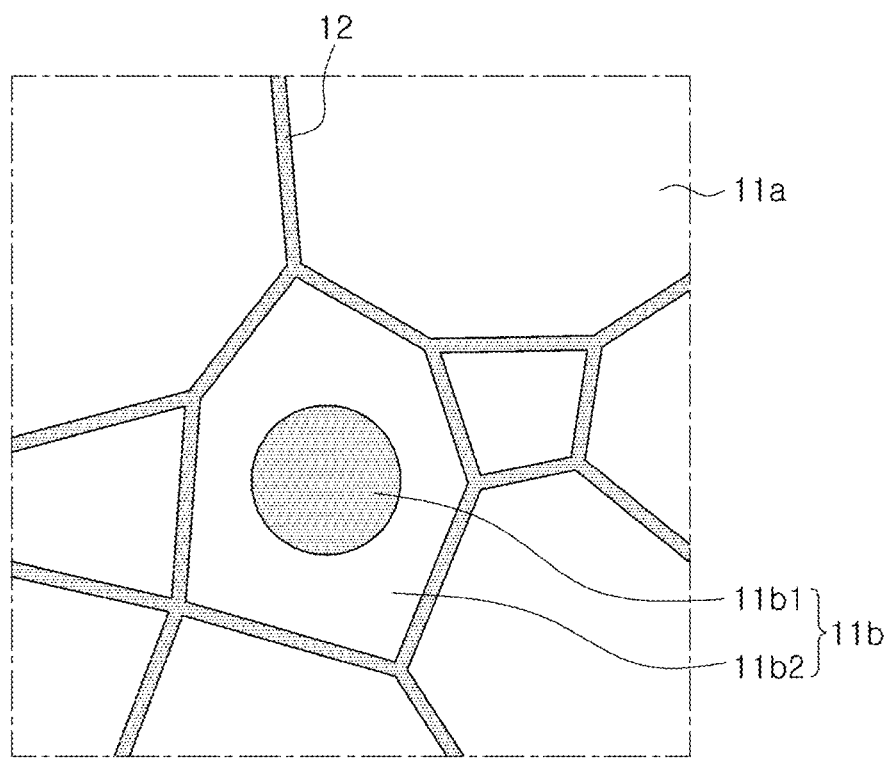
FIG. 5 is an enlarged view of region P of FIG. 2.

FIG. 5 is an enlarged view of region P of FIG. 2.

Hereinafter, a ceramic electronic component 100 according to an embodiment will be described in detail with reference to FIGS. 1 to 5. In addition, a multilayer ceramic capacitor (hereinafter referred to as 'MLCC') will be described as an example of a ceramic electronic component, but the present disclosure is not limited thereto. For example, various ceramic electronic components using a ceramic material, for example, an inductor, a piezoelectric element, a varistor, or a thermistor may be used.

The ceramic electronic component 100 according to an embodiment may include a body 110 including a dielectric layer 111 and internal electrodes 121 and 122, and external electrodes 131 and 132 disposed on the body and connected to the internal electrodes. The dielectric layer 111 has a perovskite structure represented by a general formula $ABO_3$ as a main phase, and includes a region in which Dy is solid solubilized. In the region in which Dy is solid solubilized, when the X-ray count of Dy solid-solubilized in the A-site of the perovskite structure measured using STEM-EDS is AD, and the X-ray count of Dy solid-solubilized in the B-site of the perovskite structure is BD; the average value of AD/BD may be 1.6 or more.

In the body 110, the dielectric layer 111 and the internal electrodes 121 and 122 may be alternately stacked.

A detailed shape of the body 110 is not particularly limited, but as illustrated, the body 110 may have a hexahedral shape or a shape similar thereto. Due to the shrinkage of the ceramic powder included in the body 110 during the sintering process, the body 110 may not have a perfectly straight hexahedral shape, but may have a substantially hexahedral shape.

The body 110 may have first and second surfaces 1 and 2 opposing each other in a first direction, and third and fourth surfaces connected to the first and second surfaces 1 and 2 and opposing each other in a second direction, and fifth and sixth surfaces 5 and 6 connected to the first and second surfaces 1 and 2 and connected to the third and fourth surfaces 3 and 4.

The plurality of dielectric layers 111 forming the body 110 are in a fired state, and the boundary between adjacent dielectric layers 111 may be integrated to the extent that it is difficult to check without using a scanning electron microscope (SEM).

According to an embodiment, the dielectric layer 111 has a perovskite structure represented by the general formula $ABO_3$ as a main phase, and includes a region in which Dy is solid solubilized. In the region in which Dy is solid solubilized, when the X-ray count of Dy solid-solubilized in the A-site of the perovskite structure measured by using STEM-EDS is AD, and the X-ray count of Dy solid-solubilized in the B-site of the perovskite structure is BD; the average value of AD/BD may be 1.6 or more.

A multilayer ceramic capacitor (MLCC), a ceramic electronic component, tends to have a higher capacitance and a thinner layer. As the thickness of the dielectric layer decreases, the electric field applied to the dielectric at the same operating voltage increases. Therefore, it is essential to secure the reliability of the dielectric.

As a method to improve reliability while thinning the dielectric layer, a method to increase the number of grain boundaries included in the dielectric layer by reducing the size of dielectric grains, a method to increase the insulation resistance of an interface between the dielectric layer and the internal electrode by changing the dielectric composition, or the like was considered. However, as the thickness of the dielectric layer becomes thinner, the electric field load applied to the grain boundary and the interface between the dielectric layer and the internal electrode increases, and thus, it is more difficult to secure reliability.

Accordingly, in an embodiment, by increasing the donor element included in the dielectric layer, the dielectric layer becomes an N-type semiconductor to lower the electric field load to improve reliability. When the dielectric layer becomes an N-type semiconductor, the initial insulation resistance (IR) tends to decrease. However, by appropriately increasing the leakage current to the dielectric layer, the electric field load applied to the grain boundary and the interface between the dielectric layer and the internal electrode is lowered, thereby improving reliability.

When a trivalent or higher rare earth is solid solubilized in the A-site and becomes a donor, the dielectric layer becomes an N-type semiconductor, and when solid solubilized in the Ba site of $BaTiO_3$, reactions such as the following formulas (1) and (2) occur. Referring to Formula (1) and Formula (2), the Ba defect generated in Formula (1) suppresses the movement of oxygen defects, and the electron generated in Formula (2) lowers the insulation resistance (IR), but by lowering the insulation resistance (IR) within an appropriate range, the load applied to the grain boundary or the interface may be reduced and, as a result, reliability may be improved.

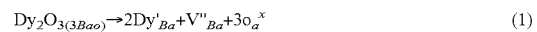

(1)

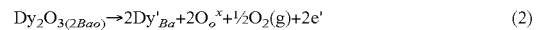

(2)

On the other hand, when the rare earth is solid solubilized in the B-site and becomes an acceptor, the dielectric layer becomes a p-type semiconductor, and is solid solubilized in the Ti site of $BaTiO_3$, reactions such as the following formulas (3) and (4) occur, and the number of holes increases.

(3)

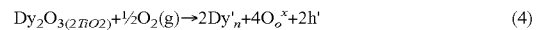

(4)

For example, to secure reliability by allowing the dielectric layer to become an N-type semiconductor, it may be important to properly control the concentration of the rare earth solid solubilized in the A-site and the rare earth solid solubilized in the B-site. When the X-ray count of Dy solid-solubilized in the A-site of the perovskite structure measured by using STEM-EDS is AD, and the X-ray count of Dy solid-solubilized in the B-site of the perovskite structure is BD; by controlling the average value of AD/BD to be 1.6 or higher, the dielectric layer may become an N-type semiconductor and the effect of improving reliability may be secured.

In addition, in the case of rare earth elements other than Dy, it may be difficult to control AD/BD to be 1.6 or more. In the case of rare earth elements having a smaller ionic radius than that of Dy, it may be difficult to dissolve in the A-site and thus, may be difficult to form an N-type semiconductor. Examples of the rare earth element having an ionic radius smaller than that of Dy may include Ho, Y, Er, Yb and the like. On the other hand, in the case of a rare-earth element having a greater ionic radius than Dy, it may be possible to more effectively substitute the A-site, but it may be difficult to provide uniformly dispersion, and thus reliability may be deteriorated. Examples of rare earth elements having a greater ionic radius than Dy may include La, Sm and the like.

Therefore, according to an embodiment, when the content of Dy solid-solubilized in the A-site is defined as AD as at %, and the content of Dy solid-solubilized in the B-site is defined as BD as at %, by controlling AD/BD to be 1.6 or more, the dielectric layer becomes an N-type semiconductor to appropriately increase the leakage current to the dielectric layer, thereby reducing the electric field load applied to the grain boundary and the interface between the dielectric layer and the internal electrode and thus improving reliability.

To measure the average value of AD/BD, atomic-level Scanning Transmission Electron Microscopy-Energy Dispersive X-ray Spectroscopy (STEM-EDS) analysis technology may be used, and measurement may be performed using STEM-EDS equipped with a Cs corrector. Other methods and/or tools appreciated by one of ordinary skill in the art, even if not described in the present disclosure, may also be used.

As a detailed example, a method of measuring AD/BD using STEM-EDS is as follows.

For AD/BD measurement, a TEM specimen that is thinned to about 50 nm from the center of the cross section cut in the length and thickness directions at the center of the sample chip in the width direction using the focused ion beam (FIB) microsampling method is prepared. Next, the surface damage layer is removed by low-speed argon ion treatment, and finally, a TEM specimen with a thickness of about 20-30 nm is fabricated. The TEM specimen may be analyzed using JEOL ARM300, which is the STEM-EDS equipment (Cs-STEM) equipped with a Cs corrector. First, after acquiring the EDS mapping at 40,000 magnification and checking the regions in which Dy is solid-solubilized, EDS mapping is acquired at 40 million times magnification in 3 of the regions in which Dy is solid-solubilized, and respective AD/BD values are analyzed in all perovskite structures included in the EDS mapping. In the EDS mapping, the X-ray count of Dy solid-solubilized in the A-site may be defined as AD, and the X-ray count of Dy solid-solubilized in the B-site of the perovskite structure may be defined as BD, and X-ray count means X-ray intensity. The X-ray count obtained from a rectangular area in which the full width half maximum (FWHM) of the HAADF intensity of each atomic column was the length of one side was used. About 100 perovskite structures may be observed per EDS mapping acquired at 40 million magnification, and since it was measured in a total of three places, about 300 data values may be obtained, and the average of the values may be provided as the average value of AD/BD.

In an embodiment, the average value of AD/BD may satisfy 1.6 or more and 2.0 or less. If the average value of AD/BD exceeds 2.0, there is a risk that the insulation resistance will drop sharply. In addition, if a rare earth element having an ionic radius greater than that of Dy is used, A-site may be substituted more effectively, but it may be difficult to control AD/BD to be 2.0 or less.

In an embodiment, in the region in which Dy is solid solubilized, when the number of atoms of Dy solid-solubilized in the A-site of the perovskite structure is AR, and the number of atoms of Dy solid-solubilized in the B-site is BR; AR/BR may be 2.1 or higher. In detail, AR/BR may be 2.1 or more and 4.2 or less.

Since the element number of the A-site element (Ba, element number 56) and the element number of the B-site element (Ti, element number 22) of $BaTiO_3$ are significantly different, due to the electron channeling phenomenon, the scattering of incident electrons and the density of respective positions are different. Therefore, even when the same amount of Dy atoms are substituted in the A-site and the B-site, different amounts of X-rays are generated depending on the substitution site and arrangement of Dy atoms. Therefore, it is difficult that the average value of AD/BD measured using STEM-EDS is regarded as a ratio to the absolute amount of the Dy element actually occupying each site. For example, the average value of AD/BD measured using STEM-EDS and AR/BR, which is a ratio to the absolute amount of the Dy element actually occupying each site, may not match each other.

Accordingly, according to an embodiment of the present disclosure, by performing a simulation in consideration of the electron channeling phenomenon, AR/BR, which is the number of atoms of Dy solid-solubilized in the A-site compared to the number of atoms of Dy solid-solubilized in the actual B-site, was predicted. When the average value of AD/BD is 1.6 or more and 2.0 or less, AR/BR may have a value of 2.1 or more and 4.2 or less.

The simulation method considering the electron channeling phenomenon does not need to be particularly limited, but as a detailed example, based on the Quantum Excitation Phonon (QEP) model, the method of calculating the density of incident electrons and the amount of X-ray generation in the specimen is used, thereby predicting AR/BR.

Figures 12A, 12B:
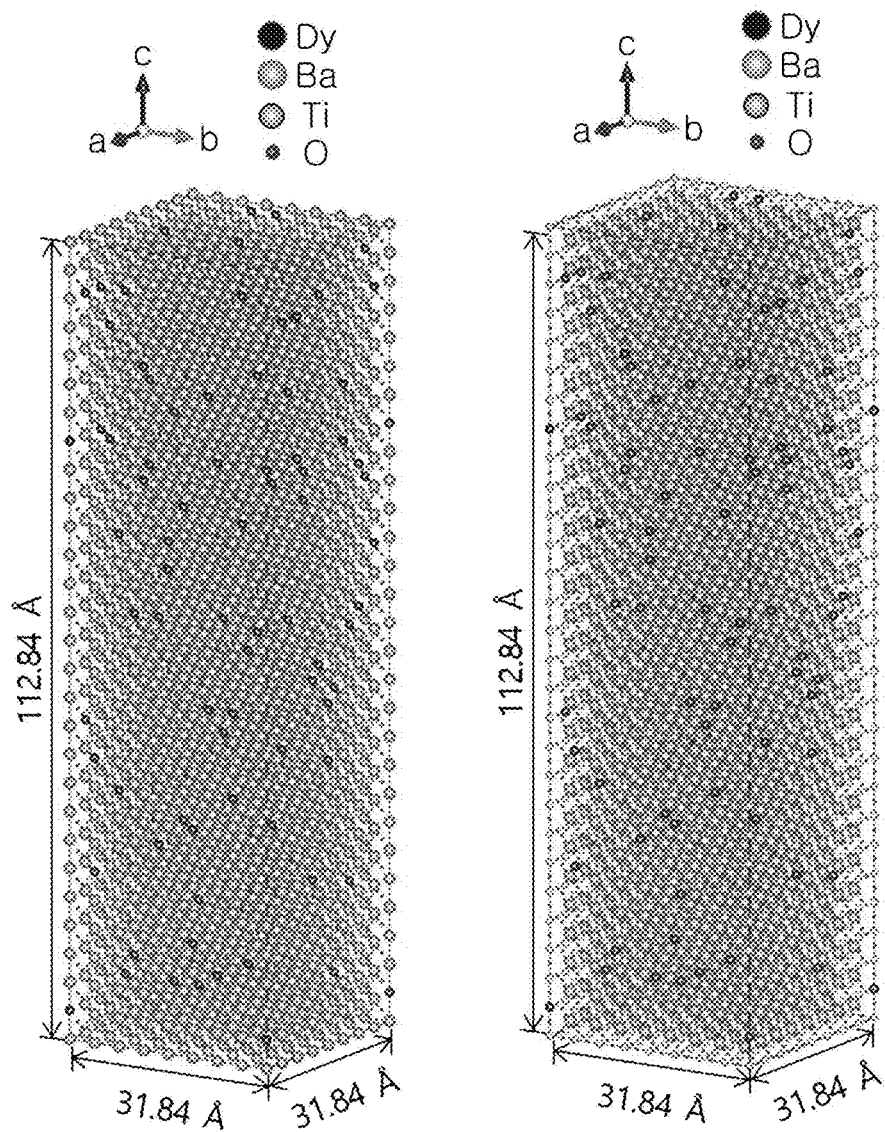
FIG. 12A is a first supercell designed to have a random distribution in an atomic column when Dy is substituted only at A-site.
FIG. 12B is a second supercell designed to have a random distribution in an atomic column when Dy is substituted only at B-site.
Figure 13A:
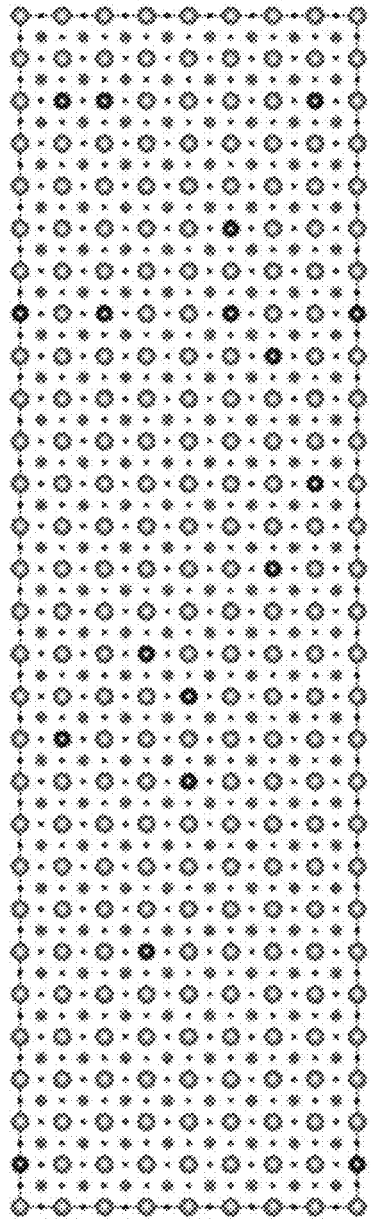
FIG. 13A is a projection of the Dy array of the first supercell.
Figure 13B:
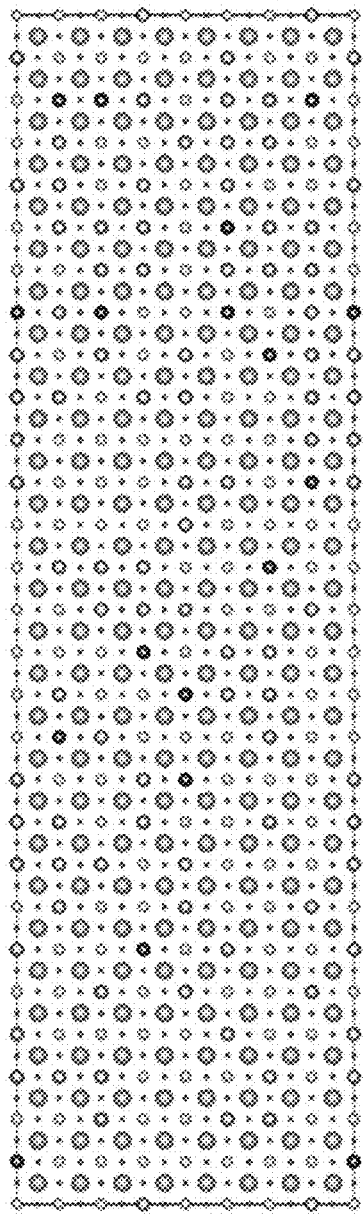
FIG. 13B is a projection of the Dy array of the second supercell.

First, with respect to the first supercell in which Dy is substituted only in the A-site and the second supercell in which Dy is substituted only in the B-site, the amount of Dy L X-ray count may be simulated. FIG. 12A is a first supercell designed to have a random distribution in an atomic column when Dy is substituted only at A-site, and FIG. 12B is a second supercell designed to have a random distribution in an atomic column when Dy is substituted only at B-site. FIG. 13A is a projection of the Dy array of the first supercell, and 13B is a projection of the Dy array of the second supercell. In this case, the super cell means a crystal structure of a specific size made by repeating unit cells. In the present disclosure, in the configuration of the supercell, to sufficiently include the region in which the electron density spreads in the adjacent atomic column due to the electron channeling phenomenon, eight unit cells were disposed in a and b directions that are perpendicular to the electron incident, respectively, and to sufficiently secure a region in which Dy may be substituted in the A-site and the B-site, 28 unit cells were disposed in a c direction, which is a direction parallel to the electron incident.

As illustrated FIGS. 12A to 13B, when Dy is substituted only in the A-site or only in the B-site, and when simulations are performed on the first supercell and the second supercell in which Dy elements have the same position distribution, more Dy L X-rays are generated in the second supercell than in the first supercell. FIG. 15A is an atomic column image generated as a result of simulation for the first supercell, and FIG. 15B is an atomic column image generated as a result of a simulation for the second supercell. FIG. 16A is a Dy L X-ray count for FIG. 15A, and FIG. 16B is a Dy L X-ray count for FIG. 15B. Referring to FIGS. 15 and 16, it can be seen that more Dy L X-rays are generated in the second supercell.

Figure 11:
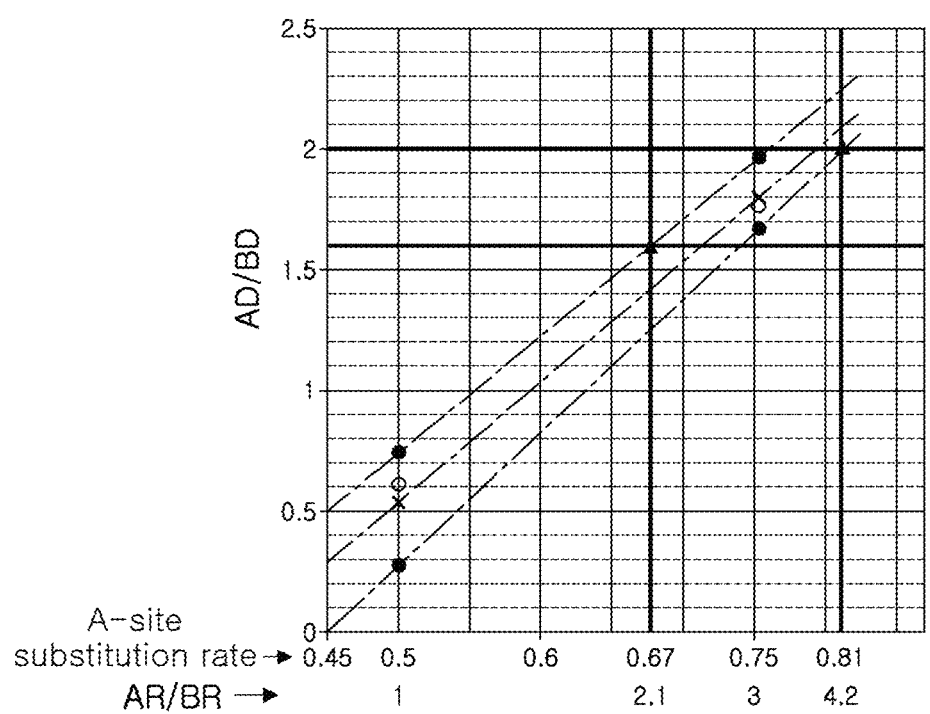
FIG. 11 is a graph illustrating AD/BD values according to AR/BR in a supercell in which simulation is performed.
Figure 14:
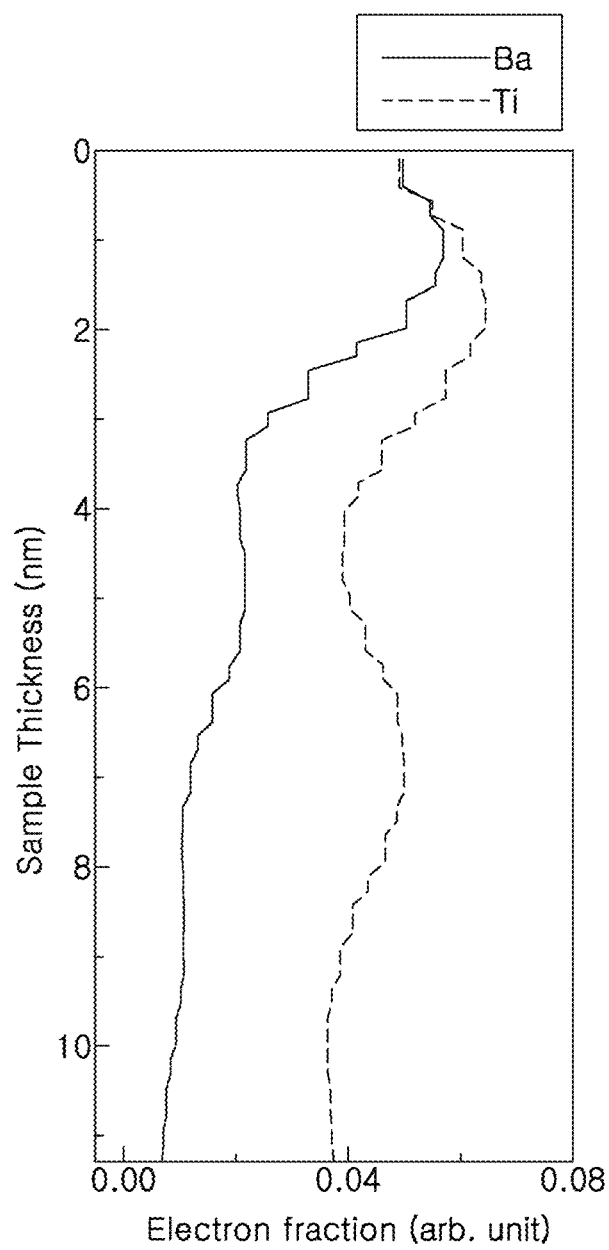
FIG. 14 is a graph illustrating the incident electron density according to the depth of the specimen in each substitution column.

On the other hand, since the atomic number of Dy is greater than those of Ba and Ti, there is a possibility that the difference in electron density according to the depth of the specimen may occur due to the doping of Dy, but since Dy element is slightly doped into BaTiO$_3$, the change in the incident electron density according to the substitution arrangement of the Dy element is negligible. Referring to FIG. 14, the main factor causing the dispersion of the amount of X-ray generation for the same amount of Dy may be limited by the type (A-site, B-site) of the atomic column substituted by the Dy element and the depth from the incident surface. Under these conditions, the amount of X-ray generation was simulated by creating a random Dy element substitution array by changing the site substitution ratio of the Dy element in the supercell. Referring to FIG. 11, when AR/BR in a supercell is 1, AD/BD may have a value of 0.28 to 0.75, when AR/BR is 3, AD/BD may have a value of 1.67 to 1.97. As the value of AR/BR increases, the number of Dy-substituted array cases decreases, and therefore, it can be expected that the dispersion of AD/BD will decrease. In addition, referring to the thick solid line in FIG. 11, when AD/BD measured using STEM-EDS is 1.6 or more and 2.0 or less, it can be confirmed that AR/BR may have a value of 2.1 or more and 4.2 or less.

In an embodiment, ABO$_3$ of the perovskite structure represented by ABO$_3$ may be BaTiO$_3$. When ABO$_3$ is BaTiO$_3$, it may be easier to control the average value of AD/BD to be 1.6 or more.

On the other hand, there is no need to particularly limit the Dy content, but Dy may be 0.1 to 4.0 mol % compared to 100 mol % of BaTiO$_3$. If the Dy content is less than 0.1 mol % compared to 100 mol % of BaTiO$_3$, the N-type semiconductorization of the dielectric layer may not be sufficient because the amount of Dy solid-solubilized in the A-site is relatively low, and if the Dy content is more than 4.0 mol % compared to 100 mol % of BaTiO$_3$, there is a fear that the insulation resistance is rapidly lowered.

In an embodiment, the dielectric layer 111 may be N-type semiconductorized.

In the present disclosure, "the dielectric layer 111 becoming an N-type semiconductor" may indicate a state in which free electrons are increased. Whether the dielectric layer 111 is an N-type semiconductor may be determined by measuring high-temperature electrical conductivity, and in the case of not having a positive slope in the high-temperature electrical conductivity graph, it may be determined that the dielectric layer 111 has been N-type semiconductorized.

In an embodiment, the dielectric layer 111 includes a plurality of grains 11$a$ and 11$b$ and grain boundaries 12 disposed between adjacent grains, and the region in which Dy is solid solubilized may be disposed in any one or more of the grains 11$a$ and 11$b$ and the grain boundaries 12.

In an embodiment, at least one of the plurality of grains may be a grain 11$a$ having a structure including a region in which Dy is solid solubilized throughout the grains. As the dielectric layer 111 becomes thinner, dielectric grains also become smaller, and in this case, the leakage current to the dielectric layer may be more effectively controlled than the case in which the region in which Dy is solid solubilized is distributed throughout the grains.

In this case, the ratio of the number of grains 11$a$ having a structure including a region in which Dy is solid solubilized in the entire grains among the plurality of grains does not need to be particularly limited. However, to more effectively control the leakage current, it may be preferable that the ratio of the number of grains having a structure including a region in which Dy is solid solubilized is 50% or more.

In addition, at least one of the plurality of grains may be a grain 11$b$ having a core 11$b$1-shell 11$b$2 structure, and a region in which Dy is solid solubilized may be included in the shell 11$b$2 of the core-shell structure shell.

In addition, some of the plurality of grains may have a core-shell structure, and some thereof may have a structure including a region in which Dy is solid solubilized throughout the grains.

However, not all grains include a region in which Dy is solid solubilized, and some grains may not include a region in which Dy is solid solubilized.

On the other hand, to measure the average value of AD/BD, atomic-level Scanning Transmission Electron Microscopy-Energy Dispersive X-ray Spectroscopy (STEM-EDS) analysis technology may be used, and the concentrations may be measured using STEM-EDS equipped with a Cs corrector.

For example, first, EDS mapping may be obtained at a magnification of 40,000× from the dielectric layer disposed in the central portion of the body 110 in the length and thickness directions, and regions in which Dy is solid solubilized may be identified. Then, EDS mapping may be acquired at a magnification of 20,000,000× in three of the regions in which Dy is solid solubilized, and respective AD/BD values may be analyzed in all perovskite structures included in the EDS mapping and may be averaged, and the averaged value may be the average value of AD/BD.

There is no need to particularly limit the method of controlling the average value of AD/BD to be 1.6 or more. For example, the average value of AD/BD may be controlled by controlling the type of the BaTiO$_3$ powder manufacturing method, the sintering temperature, the sintering atmosphere, and the like.

However, in an embodiment, the dielectric layer 111 may be formed by sintering BaTiO$_3$ powder synthesized by a co-precipitation method. Methods for producing BaTiO$_3$ powder may include a solid-phase method, co-precipitation method, hydrothermal synthesis method and the like. For example, when using the BaTiO$_3$ powder prepared by the co-precipitation method, the average value of AD/BD may be more easily controlled to be 1.6 or higher than the solid-phase method and the hydrothermal synthesis method. The co-precipitation method refers to a method of simultaneously precipitating several different ions in an aqueous or non-aqueous solution. In more detail, the co-precipitation method may be a method in which Ba-alkoxide and Ti-alkoxide are artificially mixed in an alcohol solution and then rapidly hydrolyzed to precipitate.

On the other hand, a thickness td of the dielectric layer 111 does not need to be particularly limited.

However, in general, in the case in which the dielectric layer is thinly formed to a thickness of less than 0.6 µm, in detail, in the case in which the thickness of the dielectric layer is 0.4 µm or less, there is a fear that reliability may be deteriorated.

As described above, according to an embodiment of the present disclosure, the dielectric layer may become an N-type semiconductor by setting the average value of AD/BD to 1.6 or more, and accordingly, since reliability may be improved by reducing the electric field load, excellent reliability may be secured even when the thickness of the dielectric layer 111 is 0.4 µm or less.

Therefore, when the thickness of the dielectric layer 111 is 0.4 µm or less, the reliability improvement effect according to the present disclosure may be more increased.

The thickness td of the dielectric layer 111 may indicate an average thickness of the dielectric layer 111 disposed between the first and second internal electrodes 121 and 122.

The average thickness of the dielectric layer 111 may be measured by scanning an image of a cross section of the body 110 in the length and thickness directions (L-T) with a scanning electron microscope (SEM) with a magnification of 10,000. In more detail, the average value may be measured by measuring the thicknesses at 30 points of one dielectric layer at equal intervals in the length direction in the scanned image. The 30 points at equal intervals may be designated in a capacitance forming portion Ac. In addition, in a case in which the average value is measured by extending the measurement of the average value to 10 dielectric layers, the average thickness of the dielectric layers may be more generalized.

The body 110 may include the capacitance forming portion Ac in which capacitance is formed, by including the first internal electrode 121 and the second internal electrode 122 disposed in the body 110 and disposed to oppose each other with the dielectric layer 111 interposed therebetween, and cover portions 112 and 113 formed on and below the capacitance forming portion Ac in the first direction.

In addition, the capacitance forming portion Ac is a part contributing to the capacitance formation of the capacitor, and may be formed by repeatedly stacking the plurality of first and second internal electrodes 121 and 122 with the dielectric layer 111 interposed therebetween.

The cover portions 112 and 113 may include an upper cover portion 112 disposed on the capacitance forming portion Ac in the first direction, and a lower cover portion 113 disposed below the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac in the thickness direction, respectively, and may basically serve to prevent the internal electrodes from being damaged due to physical or chemical stress.

The upper cover portion 112 and the lower cover portion 113 do not include an internal electrode and may include the same material as the dielectric layer 111.

For example, the upper cover portion 112 and the lower cover portion 113 may include a ceramic material, for example, a barium titanate ($BaTiO_3$)-based ceramic material.

On the other hand, the thickness of the cover portions 112 and 113 does not need to be particularly limited. However, to more easily obtain miniaturization and high capacitance of the ceramic electronic component, a thickness tp of the cover portions 112 and 113 may be 20 µm or less.

In addition, margin portions 114 and 115 may be disposed on a side surface of the capacitance forming portion Ac.

The margin portions 114 and 115 may include a margin portion 114 disposed on the fifth surface 5 of the body 110, and a margin portion 115 disposed on the sixth surface 6 of the body 110. For example, the margin portions 114 and 115 may be disposed on both sides of the ceramic body 110 in the width direction.

As illustrated in FIG. 3, the margin portions 114 and 115 may refer to regions between both ends of the first and second internal electrodes 121 and 122 and the boundary surfaces of the body 110 in a cross-section of the body 110 cut in the width-thickness (WT) direction of the body 110.

The margin portions 114 and 115 may basically serve to prevent the internal electrodes from being damaged due to physical or chemical stress.

The margin portions 114 and 115 may be formed by forming internal electrodes by applying a conductive paste on a ceramic green sheet except a region thereof in which the margin portion is to be formed.

In addition, to suppress formation of the step difference caused by the internal electrodes 121 and 122, the internal electrodes are cut to be exposed to the fifth and sixth surfaces 5 and 6 of the body after the stacking thereof, and then a single dielectric layer or two or more dielectric layers are stacked on both side surfaces of the capacitance forming portion Ac in the width direction, to form the margin portions 114 and 115.

The internal electrodes 121 and 122 are alternately stacked with the dielectric layer 111.

The internal electrodes 121 and 122 may include first and second internal electrodes 121 and 122. The first and second internal electrodes 121 and 122 are alternately disposed to face each other with the dielectric layer 111 constituting the body 110 and interposed therebetween, and may be exposed to the third and fourth surfaces 3 and 4 of the body 110, respectively.

Referring to FIG. 2, the first internal electrode 121 may be spaced apart from the fourth surface 4 and exposed through (or extending from or be in contact with) the third surface 3, and the second internal electrode 122 may be spaced apart from the third surface 3 and may be exposed through (or extending from or be in contact with) the fourth surface 4.

In this case, the first and second internal electrodes 121 and 122 may be electrically separated from each other by the dielectric layer 111 disposed therebetween.

Referring to FIG. 4, the body 110 may be formed by alternately stacking a ceramic green sheet on which the first internal electrode 121 is printed and a ceramic green sheet on which the second internal electrode 122 is printed, and then sintering the same.

The internal electrodes 121 and 122 may include Ni. However, the material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed, by printing a conductive paste for internal electrodes, including at least one of nickel (Ni), copper (Cu), palladium (Pd), silver (Ag), gold (Au), platinum (Pt), tin (Sn), tungsten (W), titanium (Ti) and alloys thereof, on a ceramic green sheet. The printing method of the conductive paste for internal electrodes may use a screen printing method or a gravure printing method, but the present disclosure is not limited thereto.

On the other hand, the thickness te of the internal electrodes 121 and 122 does not need to be particularly limited.

However, in general, if the internal electrode is thinly formed to a thickness of less than 0.6 µm, in detail, if the thickness of the internal electrode is 0.4 µm or less, there is a fear that reliability may be deteriorated.

As described above, according to an embodiment of the present disclosure, the dielectric layer may become an N-type semiconductor by setting the average value of AD/BD to 1.6 or more, and accordingly, since the reliability may be improved by reducing the electric field load, excellent reliability may be secured even when the thickness of the internal electrodes 121 and 122 is 0.4 µm or less.

Accordingly, when the thickness of the internal electrodes 121 and 122 is 0.4 µm or less, the effect according to the present disclosure may be more improved, and miniaturization and high capacitance of the ceramic electronic component may be more easily obtained.

The thickness te of the internal electrodes 121 and 122 may indicate an average thickness of the internal electrodes 121 and 122.

The average thickness of the internal electrodes 121 and 122 may be measured by scanning an image of a cross-section of the body 110 in the length and thickness directions (L-T) with a scanning electron microscope (SEM) with a magnification of 10,000. In more detail, the average value may be measured by measuring the thicknesses of one internal electrode at 30 points at equal intervals in the length direction in the scanned image. The 30 points at equal intervals may be designated in the capacitance forming portion Ac. In addition, in the case in which the average value is measured by extending the measurement of the average value to 10 internal electrodes, the average thickness of the internal electrodes may be further generalized.

The external electrodes 131 and 132 may be disposed on the third surface 3 and the fourth surface 4 of the body 110.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover both end surfaces of the side margin portions 114 and 115 in the second direction.

In the present embodiment, the structure in which the ceramic electronic component 100 has two external electrodes 131 and 132 is described. However, the number and shape of the external electrodes 131 and 132 may be changed depending on the shape of the internal electrodes 121 and 122, or for other usage.

On the other hand, the external electrodes 131 and 132 may be formed using any material as long as the material has electrical conductivity, such as metal, and a detailed material may be determined in consideration of electrical characteristics and structural stability, and furthermore, the external electrode may have a multilayer structure.

For example, the external electrodes 131 and 132 may include electrode layers 131a and 132a disposed on the body 110, and plating layers 131b and 132b formed on the electrode layers 131a and 132a.

As a more detailed example of the electrode layers 131a and 132a, the electrode layers 131a and 132a may be the sintered electrode including a conductive metal and glass, or a resin-based electrode including a conductive metal and a resin.

In addition, the electrode layers 131a and 132a may have a shape in which a sintered electrode and a resin-based electrode are sequentially formed on a body. In addition, the electrode layers 131a and 132a may be formed by transferring a sheet including a conductive metal onto the body or by transferring a sheet including a conductive metal onto the sintered electrode.

As the conductive metal included in the electrode layers 131a and 132a, a material having excellent electrical conductivity may be used, and the material is not particularly limited. For example, the conductive metal may be one or more of nickel (Ni), copper (Cu), and alloys thereof.

The plating layers 131b and 132b serve to improve mounting characteristics. The type of the plating layers 131b and 132b is not particularly limited, and may be a plating layer including at least one of Ni, Sn, Pd, and alloys thereof, and may be formed of a plurality of layers.

As a more detailed example of the plating layers 131b and 132b, the plating layers 131b and 132b may be a Ni plating layer or a Sn plating layer, and may have a shape in which a Ni plating layer and a Sn plating layer are sequentially formed on the electrode layers 131a and 132a, and may have a shape in which a Sn plating layer, a Ni plating layer, and a Sn plating layer are sequentially formed. In addition, the plating layers 131b and 132b may include a plurality of Ni plating layers and/or a plurality of Sn plating layers.

The size of the ceramic electronic component 100 does not need to be particularly limited.

However, to obtain miniaturization and high capacitance at the same time, since the number of stacks should be increased by reducing the thicknesses of the dielectric layer and the internal electrode, the reliability and insulation resistance improvement effect according to the present disclosure may be more improved in the ceramic electronic component 100 having a size of 1005 (length×width, 1.0 mm×0.5 mm) or less.

Therefore, in consideration of manufacturing errors and external electrode sizes, when the length of the ceramic electronic component 100 is 1.1 mm or less and the width is 0.55 mm or less, the reliability improvement effect according to the present disclosure may be more significant. In this case, the length of the ceramic electronic component 100 may indicate the size of the ceramic electronic component 100 in the second direction, and the width of the ceramic electronic component 100 may indicate the size of the ceramic electronic component 100 in the third direction.

A ceramic electronic component according to an embodiment of the present disclosure includes a body including a dielectric layer and an internal electrode; and an external electrode disposed on the body and connected to the internal electrode. The dielectric layer has a perovskite structure represented by the general formula $ABO_3$ as a main phase and includes the region in which Dy is solid-solubilized. In the region in which Dy is solid solubilized, when the number of atoms of Dy solid-solubilized in the A-site of the perovskite structure is AR, and the number of atoms of Dy solid-solubilized in the B-site of the perovskite structure is BR; AR/BR may be 2.1 or more and 4.2 or less.

EXPERIMENTAL EXAMPLE

After preparing a dielectric composition containing barium titanate ($BaTiO_3$) powder as a main component, 1.4 mol % of Dy compared to 100 mol % of $BaTiO_3$, and other subcomponents, an internal electrode pattern was formed by applying a conductive paste for an internal electrode, including Ni, onto the ceramic green sheet including the dielectric composition. Then, a laminate obtained by laminating the ceramic green sheets on which the internal electrode pattern is formed was cut in chip units and then fired to prepare a sample chip. However, in Comparative Example 1, a barium titanate ($BaTiO_3$) powder produced by a solid-phase method was used, and in Comparative Example 2, a barium titanate ($BaTiO_3$) powder produced by a hydrothermal synthesis method was used, and in the Invention Example, a barium titanate ($BaTiO_3$) powder produced by a co-precipitation method was used.

Figure 8:
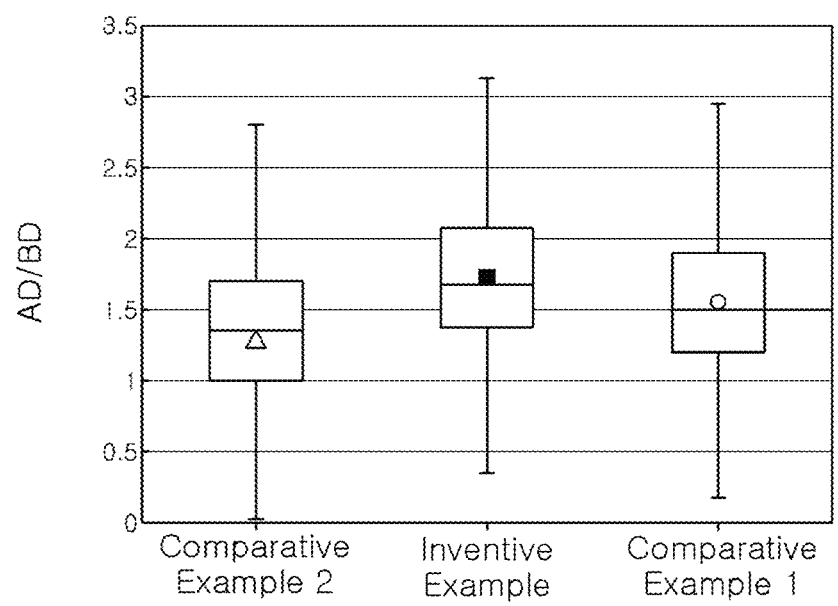
FIG. 8 is the result (AD/BD) of measuring the X-ray count of Dy solid-solubilized in an A-site compared to the X-ray count of Dy solid-solubilized in a B-site in Comparative Example 1, Comparative Example 2 and the Inventive Example.

First, for Comparative Examples 1 and 2 and the Inventive Example, the Dy content (AD/BD) solid solubilized in the A-site compared to the Dy content in the B-site was measured, and the results are illustrated in FIG. 8.

For AD/BD measurement, a TEM specimen that was thinned to about 50 nm from the center of the cross-section cut in the length and thickness directions in a central portion of the sample chip in the width direction was prepared using the focused ion beam (FIB) micro-sampling method. Next, the surface damage layer was removed by low-acceleration argon ion treatment, and finally, the TEM specimen having a thickness of about 20-30 nm was fabricated.

The TEM specimen was analyzed using JEOL ARM300, as the STEM-EDS equipment (Cs-STEM) equipped with a Cs corrector. First, EDS mapping was acquired at 40,000× magnification, and regions in which Dy was solid solubilized were identified. Thereafter, EDS mapping was obtained at 20,000,000× magnification in three of the regions in which Dy was solid solubilized, and respective AD/BD values were analyzed in all perovskite structures included in the EDS mapping. About 100 perovskite structures were observed per EDS mapping obtained at 20,000,000× magnification, and were measured in a total of three places, and thus, about 300 data values of each of Comparative Example 1, Comparative Example 2, and Inventive Example could be obtained, and the average and distribution thereof are illustrated in FIG. 8.

Referring to FIG. 8, the area in which data values corresponding to 25 to 75% of the data values exist is indicated by a square box, and the area indicated by diamonds is an average value. AD/BD of Comparative Example 1 was 1.55, AD/BD of Comparative Example 2 was 1.38, and AD/BD of Inventive Example was 1.68.

Figure 6A:
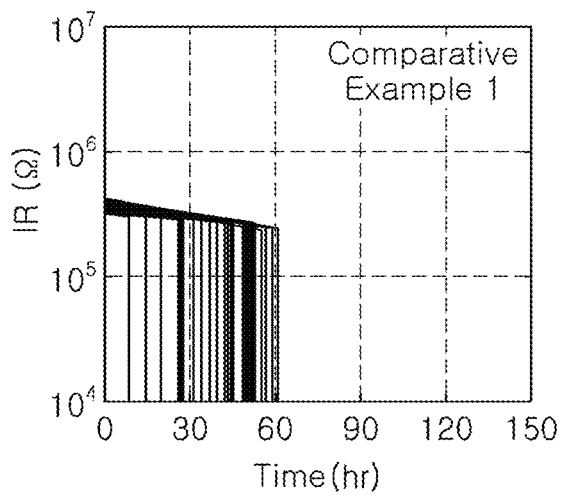
FIG. 6A shows high-temperature accelerated life test results of Comparative Example 1.
Figure 6B:
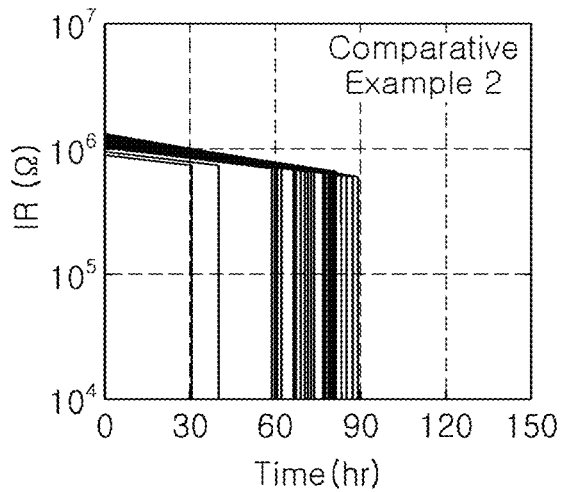
FIG. 6B shows high-temperature accelerated life test results of Comparative Example 2.
Figure 6C:
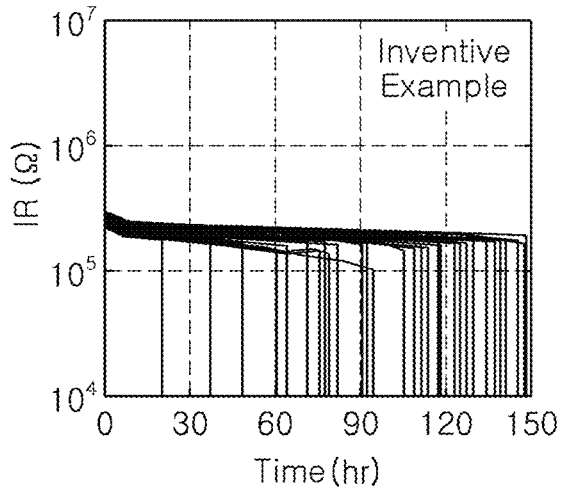
FIG. 6C shows high-temperature accelerated life test results of the Inventive Example.
Figure 7:
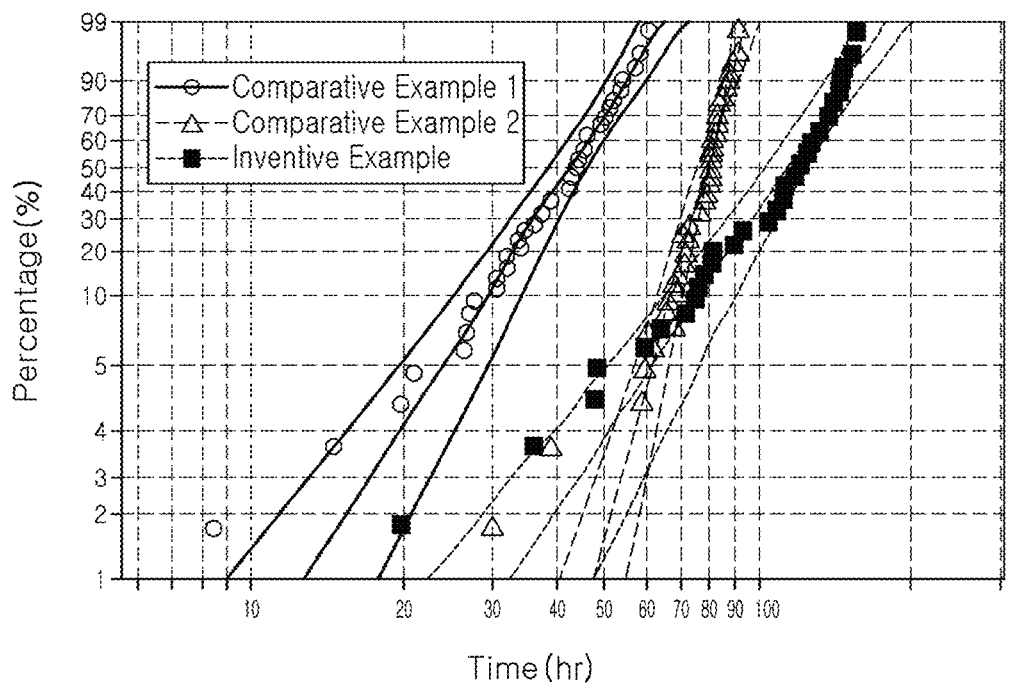
FIG. 7 is a graph illustrating the results of the high-temperature accelerated life test of FIGS. 6A to 6C as Weibull distribution.

Next, a high-temperature accelerated life test was performed for Comparative Example 1, Comparative Example 2, and the Invention Example, and the result graphs are illustrated in FIGS. 6A, 6B, and 6C, and the result of the high-temperature accelerated life test is illustrated in FIG. 7 as a Weibull distribution.

For the high-temperature accelerated life test, 40 sample chips were prepared for each of Comparative Examples 1 and 2, and the Inventive Example, and a voltage of 75V was applied at 160° C., and then the change in insulation resistance was observed.

Referring to FIGS. 6A, 6B, and 6C, it can be seen that the value of the initial insulation resistance decreases as the AD/BD value increases. For example, the value of the initial insulation resistance decreases in the order of Comparative Example 2, Comparative Example 1, and the Inventive Example. Comparing the average lifespan, the average lifespan of Comparative Example 1 is 39.30 (hr), the average lifespan of Comparative Example 2 is 75.40 (hr), and the average lifespan of the Inventive Example is 105.76 (hr), and it can be confirmed that the Invention Example is the highest. As AD/BD satisfies 1.6 or more, it may be determined that the dielectric layer became an N-type semiconductor, thereby reducing the electric field load and improving reliability.

Table 1 below summarizes the AD/BD, average lifespan, and initial insulation resistance values at 160° C. of Comparative Examples 1 and 2 and the Inventive Example.

TABLE 1

| Category | AD/BD | Average lifespan (hr) | Initial insulation resistance (160° C., Ω) |
|---|---|---|---|
| Comparative Example 1 | 1.55 | 39.30 | 2.5E+05 |
| Comparative Example 2 | 1.38 | 75.40 | 1.0E+06 |
| Inventive Example | 1.68 | 105.76 | 1.5E+05 |

Referring to Table 1, in the case of Comparative Example 1, the AD/BD value is higher than that of Comparative Example 2, and thus, the insulation resistance is low, but the reliability is not improved because the dielectric layer does not become an N-type semiconductor, and it can be seen that the lifetime is shorter than in Comparative Example 2 due to a relatively low insulation resistance value. As the AD/BD value increases, the average lifespan decreases, and as the AD/BD value becomes 1.6 or more, it can be seen that thin the Average lifespan is significantly improved.

Figure 9:
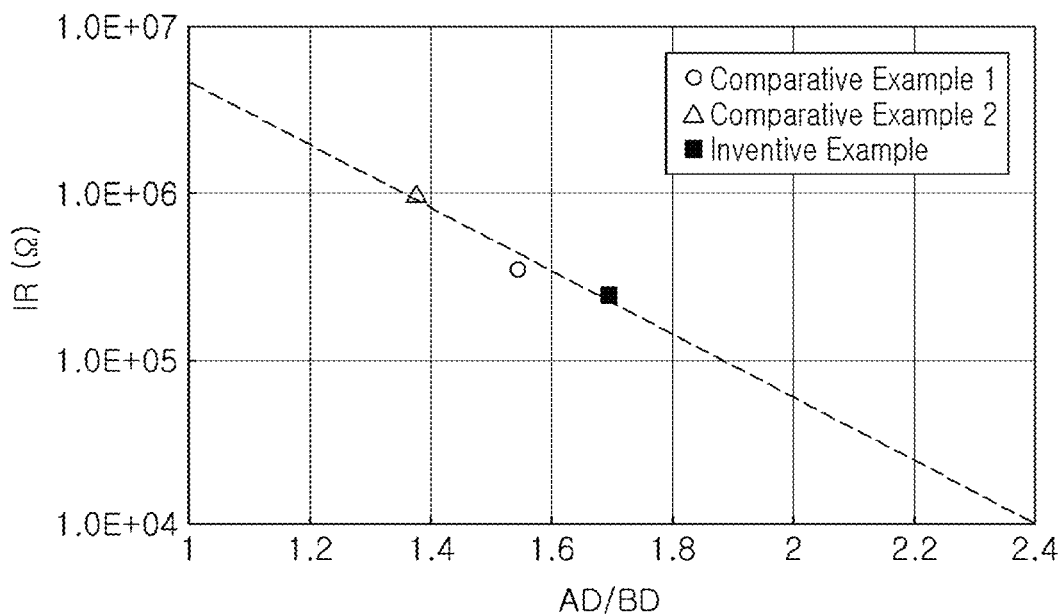
FIG. 9 is a result of measuring initial insulation resistance of Comparative Example 1, Comparative Example 2, and the Inventive Example.

FIG. 9 is a graph illustrating the values of the initial insulation resistance at AD/BD and 160° C. of Comparative Examples 1 and 2 and the Inventive Example. Referring to the trend line indicated by the dotted line, it can be seen that the initial insulation resistance decreases as the AD/BD value increases. When AD/BD exceeds 2.0, the value of the initial insulation resistance at 160° C. is lowered to about $2.5 \times 10^4$ (Ω), and thus, the initial insulation resistance value at room temperature may not satisfy the mass production standard.

Figure 10:
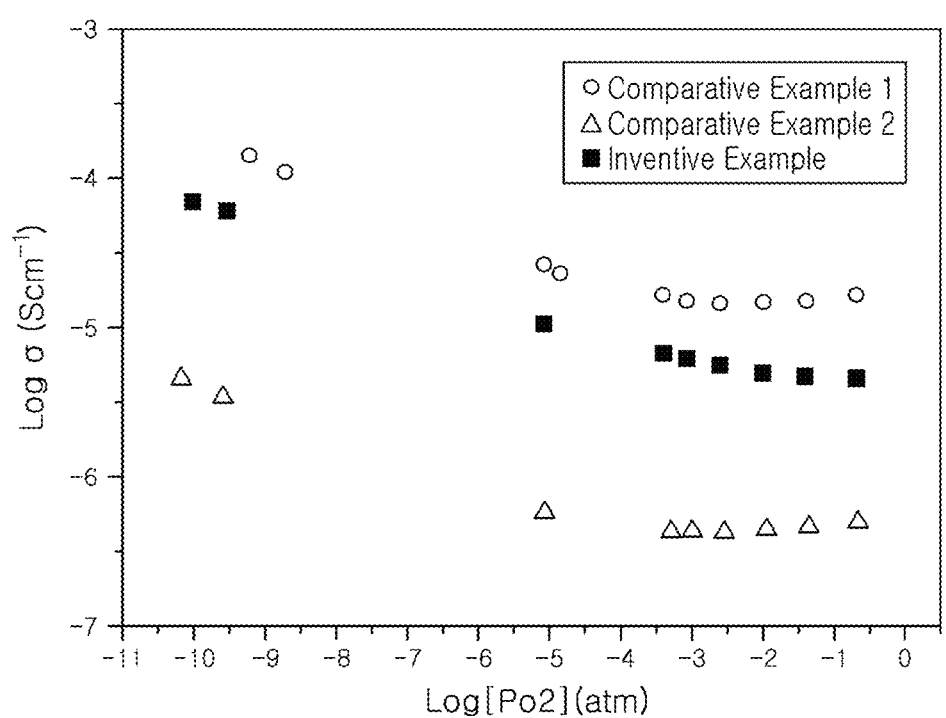
FIG. 10 is a result of measuring a high-temperature electrical conductivity of Comparative Example 1, Comparative Example 2, and the Inventive Example.

FIG. 10 is a result of measuring the high-temperature electrical conductivity of Comparative Example 1, Comparative Example 2, and the Inventive Example. The X-axis of FIG. 10 is Log[Po2] (atm), the partial pressure of oxygen expressed in a logarithmic scale, and the Y-axis is Log[σ] (Scm$^{-1}$), the electrical conductivity expressed in a logarithmic scale.

For high-temperature electrical conductivity, 2-probe conductivity was measured at 1000° C. using a mass flow controller (MFC) while changing the oxygen partial pressure through gas flow control.

When the high-temperature electrical conductivity gradually decreases as the oxygen partial pressure increases, it may be determined that the N-type semiconductor is formed. For example, when the graph of high-temperature electrical conductivity in FIG. 10 does not have a positive slope, it may be determined that the N-type semiconductor is formed, and when a section with a positive slope appears, it may be determined that the N-type semiconductor is not formed.

In the Inventive Example, since the high-temperature electrical conductivity gradually decreases as the oxygen partial pressure increases, it may be determined that a positive slope is not provided and an N-type semiconductors is formed, and in Comparative Examples 1 and 2, when a Log(Po2) value is −3 or more, since the high-temperature electrical conductivity rises again and a positive slope is provided, it may be determined that an N-type semiconductor is not formed in Comparative Examples 1 and 2.

As set forth above, according to an embodiment, as one effect among various effects of the present disclosure, reliability may be improved by controlling the content of Dy solid-solubilized in A-site compared to the content of Dy solid-solubilized in B-site in the perovskite structure represented by $ABO_3$.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A ceramic electronic component comprising:
   a body including a dielectric layer and an internal electrode; and
   an external electrode disposed on the body and connected to the internal electrode,
   wherein the dielectric layer has a perovskite structure represented by a formula $ABO_3$ as a main phase, and includes a region in which Dy is solid solubilized, and
   in the region in which the Dy is solid solubilized, an X-ray count of Dy solid-solubilized in an A-site of the perovskite structure is AD, an X-ray count of Dy solid-solubilized in a B-site of the perovskite structure is BD, and an average value of AD/BD is 1.6 or more and 2.0 or less.

2. The ceramic electronic component of claim 1, wherein the $ABO_3$ includes $BaTiO_3$.

3. The ceramic electronic component of claim 2, wherein a content of the Dy is 0.1 to 4.0 mol % compared to 100 mol % of the $BaTiO_3$.

4. The ceramic electronic component of claim 1, wherein the dielectric layer includes a plurality of grains, and grain boundaries disposed between adjacent grains, and
   the region in which Dy is solid solubilized is disposed at at least one of the grains and the grain boundaries.

5. The ceramic electronic component of claim 4, wherein at least one of the plurality of grains has a structure including a region in which Dy is solid solubilized throughout the grains.

6. The ceramic electronic component of claim 5, wherein among the plurality of grains, a ratio of the number of the grains having a structure including the region in which Dy is solid solubilized throughout the grains is 50% or more.

7. The ceramic electronic component of claim 4, wherein at least one of the plurality of grains has a core-shell structure, and the region in which Dy is solid solubilized is included in a shell of the core-shell structure.

8. The ceramic electronic component of claim 4, wherein at least one of the plurality of grains has a structure including a region in which Dy is solid solubilized throughout the grains, at least one of the plurality of grains has a core-shell structure, and the region in which Dy is solid solubilized is included in a shell of the core-shell structure.

9. The ceramic electronic component of claim 1, wherein an average thickness of the dielectric layer is 0.4 μm or less.

10. The ceramic electronic component of claim 1, wherein an average thickness of the internal electrode is 0.4 μm or less.

11. The ceramic electronic component of claim 1, wherein the dielectric layer is formed by sintering $BaTiO_3$ powder synthesized by a co-precipitation method.

12. The ceramic electronic component of claim 1, wherein the dielectric layer includes an N-type semiconductor.

13. The ceramic electronic component of claim 1, wherein, in the region in which the Dy is solid solubilized, a number of atoms of Dy solid-solubilized in an A-site of the perovskite structure is AR, a number of atoms of Dy solid-solubilized in a B-site of the perovskite structure is BR, and AR/BR is 2.1 or higher.

14. The ceramic electronic component of claim 1, wherein AD and BD are obtained by Scanning Transmission Electron Microscopy-Energy Dispersive X-ray Spectroscopy (STEM-EDS).

15. A ceramic electronic component comprising:
   a body including a dielectric layer and an internal electrode; and
   an external electrode disposed on the body and connected to the internal electrode,
   wherein the dielectric layer has a perovskite structure represented by a formula $ABO_3$ as a main phase, and includes a region in which Dy is solid solubilized,
   in the region in which Dy is solid solubilized, a content of Dy solid-solubilized in an A-site of the perovskite structure is defined as AD as at %, a content of Dy solid-solubilized in a B-site is defined as BD as at %, and AD/BD is 1.6 or higher,
   the dielectric layer includes a plurality of grains and a grain boundary disposed between adjacent grains, and
   at least one of the plurality of grains has a core-shell structure, and the region in which the Dy is solid solubilized is included in a shell of the core-shell structure.

16. The ceramic electronic component of claim 15, wherein among the plurality of grains, a ratio of the number of grains having a structure including the region in which Dy is solid solubilized throughout the grains is 50% or more.

17. The ceramic electronic component of claim 16, wherein the $ABO_3$ includes $BaTiO_3$.

18. The ceramic electronic component of claim 17, wherein a content of the Dy is 0.1 to 4.0 mol % compared to 100 mol % of the $BaTiO_3$.

19. The ceramic electronic component of claim 15, wherein, in the region in which the Dy is solid solubilized, a number of atoms of Dy solid-solubilized in an A-site of the perovskite structure is AR, a number of atoms of Dy solid-solubilized in a B-site of the perovskite structure is BR, and AR/BR is 2.1 or higher.

20. The ceramic electronic component of claim 15, wherein at least another of the plurality of grains has a structure including a region in which Dy is solid solubilized throughout the at least another of the plurality of grains.

21. The ceramic electronic component of claim 15, wherein at least another of the plurality of grains does not include a region in which Dy is dissolved.

22. A ceramic electronic component comprising:
   a body including a dielectric layer and an internal electrode; and
   an external electrode disposed on the body and connected to the internal electrode,
   wherein the dielectric layer has a perovskite structure represented by a formula $ABO_3$ as a main phase, and includes a region in which Dy is solid solubilized,
   in the region in which the Dy is solid solubilized, a number of atoms of Dy solid-solubilized in an A-site of the perovskite structure is AR, a number of atoms of Dy solid-solubilized in a B-site of the perovskite structure is BR, and AR/BR is 2.1 or higher, the dielectric layer includes a plurality of grains and grain boundaries disposed between adjacent grains, the region in which the Dy is solid solubilized is disposed in at least one of the grains and the grain boundaries, and at least one of the plurality of grains has a core-shell structure, and the region in which the Dy is solid solubilized is included in a shell of the core-shell structure.

23. The ceramic electronic component of claim 22, wherein the AR/BR is 2.1 or more and 4.2 or less.

24. The ceramic electronic component of claim 22, wherein the $ABO_3$ includes $BaTiO_3$.

25. The ceramic electronic component of claim 24, wherein a content of the Dy is 0.1 to 4.0 mol % compared to 100 mol % of the $BaTiO_3$.

26. The ceramic electronic component of claim 22, wherein at least another of the plurality of grains has a structure including a region in which Dy is solid solubilized in an entirety of the grain.

27. The ceramic electronic component of claim 26, wherein, among the plurality of grains, a ratio of the number of grains having the structure including the region in which Dy is solid solubilized in the entirety of the grain is 50% or more.

28. The ceramic electronic component of claim 22, wherein an average thickness of the dielectric layer is 0.4 μm or less.

29. The ceramic electronic component of claim 22, wherein an average thickness of the internal electrode is 0.4 μm or less.

30. The ceramic electronic component of claim 22, wherein the dielectric layer is formed by sintering $BaTiO_3$ powder synthesized by a co-precipitation method.

31. The ceramic electronic component of claim 22, wherein the dielectric layer includes an N-type semiconductor.

32. The ceramic electronic component of claim 22, wherein at least another of the plurality of grains does not include a region in which Dy is dissolved.

* * * * *